BEST AVAILABLE COPY
June 12, 1923.　　　　　　　　　　　　　　　　1,458,143
H. J. MULLER
OPTICAL METHOD AND APPARATUS
Filed June 8, 1920
*Fig 2*
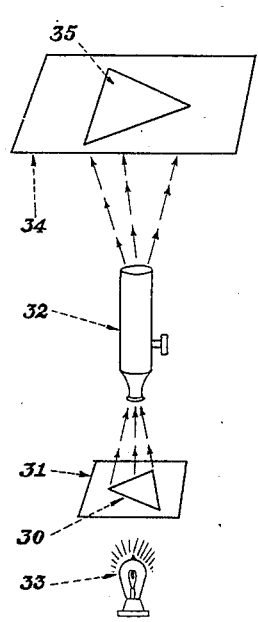
*Fig 1*
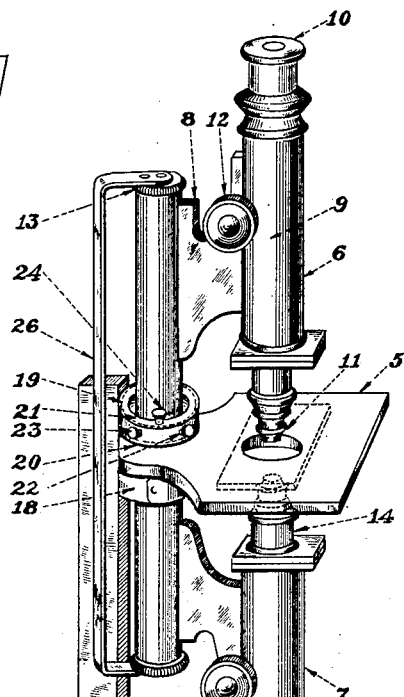
*Fig 3*
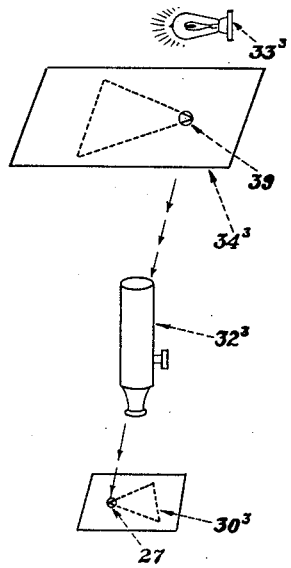
*Fig 5*
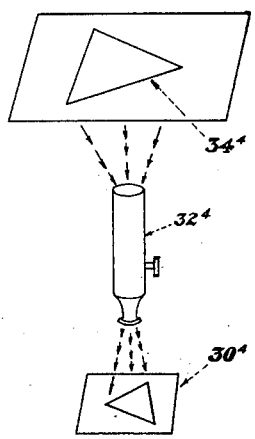
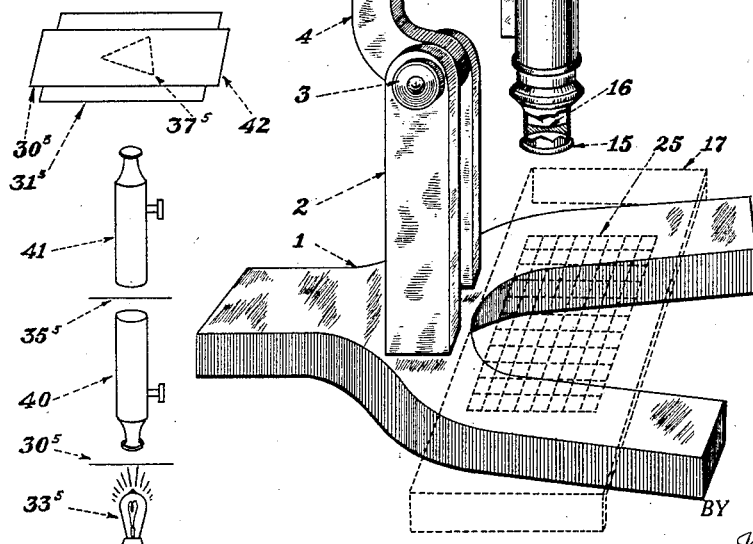
*Fig 4*
INVENTOR.
HERMANN J. MULLER
BY
Morris Hirsch.
ATTORNEY.

Patented June 12, 1923.

1,458,143

UNITED STATES PATENT OFFICE.

HERMANN J. MULLER, OF NEW YORK, N. Y.

OPTICAL METHOD AND APPARATUS.

Application filed June 8, 1920. Serial No. 387,286.

*To all whom it may concern:*

Be it known that I, HERMANN J. MULLER, a citizen of the United States, and resident of New York, in the county of New York and State of New York, have invented certain new and useful Improvements in Optical Methods and Apparatus, of which the following is a specification.

My present invention relates to optical methods and apparatus.

An object of the invention is to provide one or more simple and dependable methods which can be utilized to advantage for practicing any or all of the following arts: making microscopic photographs of tangible objects, making magnified photographs of microscopic objects, making photographs of microscopic objects magnified and superposed upon tangible objects, making microscopic photographs of microscopic objects, treating localized areas of microscopic objects to any kind of light, performing measurements upon and making accurate and magnified sketches of microscopic organisms or other objects.

Another object of my invention is to provide apparatus simple in construction and easy to operate which can be utilized with maximum convenience for carrying out any or all of the above arts, although apparatus of materially different character might be used with good results for this purpose.

In the specification and claims I apply the term reversed or counter-micrography to cover generically the photographic processes above referred to, that is, making microscopic photographs of tangible objects, making photographs of microscopic objects magnified and superposed upon tangible objects and making microscopic photographs of objects of microscopic dimensions. The term "tangible" refers to objects of dimensions easily visible with the naked eye as distinguished from microscopic objects.

The art above referred to of treating localized areas of microscopic objects with light of any character to the exclusion of the rest of the microscopic object which is kept substantially dark may be practiced by my method even though the microscopic object has an irregular movement of its own, and the apparatus of my invention may be used in this relation whether the microscopic object is stationary or movable.

By my invention, I practice all of the above arts through the application of a common principle which I will term reversed microscopy. This consists broadly in projecting light through a microscope in a reversed direction so as to produce an extremely reduced image either of an object or of some other source of light of a restricted size and definite pattern as the case may be, directly upon another object. The term "reversed direction" is from ocular to objective, which is the reverse of that in which light travels when the microscope is used for ordinary magnifying purposes. To carry out this principle I prefer to employ an ordinary compound microscope which I dispose between the two objects or between the source of light and one object, adjusting the microscope so as to dispose the source of light or the object which furnishes the light at the focal plane which is nearer the eyepiece and the other object on which the light is to be projected at the focal plane which is nearer the objective lens of the microscope. Thus it will be seen that a reduced image of the first object or the source of direct light as the case may be, will be focused by the microscope in superposed relation upon the other object.

Applying this principle to the art of reversed micrography, microscopic photographs of tangible objects will be made by disposing a compound microscope in such position that light from the object will enter its eyepiece and placing a photographic film or plate adjacent the objective of the microscope so that light coming through the objective will fall upon it and then adjusting the microscope until the object and the film are in complementary focal planes and directing light of the proper intensity from the object through the microscope in reverse direction (from eyepiece to objective) to the film. The light normally reflected from the object will ordinarily be sufficient when focused upon the smaller film to make the positive. In this way either a single negative or a succession of negatives of a moving object for a moving picture may be obtained. In the latter case, the moving object is preferably kept in focus by the use of a second microscope as described subsequently.

For the sake of conciseness, the focal plane lying outside of the microscope adjacent its objective lens will be termed the "objective plane" and that lying outside of the microscope nearer its eyepiece end will be termed the "ocular plane" although it is, of course, understood that both ocular and objective lenses have other focal planes, inside the microscope, and also that the so-called "ocular plane" may not be sensibly a plane but may have a very considerable depth. Moreover, when these planes are mentioned only those portions of the planes are referred to which are in such position that they could actually receive light directed through the microscope.

In the treatment of a localized area of a microscopic object with light of any desired intensity while maintaining the rest of the microscopic object substantially dark, it will be understood that the microscopic object and a source of light of desired size and shape are disposed at conjugate focal planes of the microscope in a manner analogous to that set forth above, the microscopic object lying in the objective plane and the source of light in the ocular plane. The light in this case is preferably either projected through a pin hole or other hole of the desired size and shape formed in a plate or sheet located in the ocular plane, or it is reflected from a bright surface such as a drop of mercury, which lies in this plane; so that a reduced image of the luminous hole or surface which may be considerably smaller than the size of the microscopic object is projected in reverse direction upon the microscopic object which lies in the objective plane. The luminous pinhole or drop will be the source of light for all practical purposes, and the adjustment described above is made with respect to said luminous hole or drop.

In measuring or drawing a microscopic object according to my method the microscopic object is placed in the objective plane as in the foregoing case, but a scale or a sheet of drawing paper respectively will be placed in the ocular plane instead of the plate or sheet previously described; thus, a greatly reduced image of the scale or of the sheet of paper will be focused upon the plane of the microscopic object by light which passes through the microscope in the reversed direction.

To perform the measurement or to make the drawing, the microscopic object with the greatly reduced superposed image will preferably be viewed by means of light passing in the ordinary direction through another microscope, the latter produces upon the retina of the eye a magnified image of the object with a superposed magnified image of the reduced image of the paper or scale. The magnified image of the microscopic object will, therefore, appear to the eye as superposed upon substantially the normal sized sheet of paper or scale and the drawing or measurements can be readily made.

In the preferred manner of executing all of the above methods, a second microscope will be provided disposed as in the case last described. While viewing a microscopic object through the second or magnifying microscope, the first or reducing microscope will be manually adjusted until an image of the tangible object or source of light, as the case may be, at the opposite end of the said reducing microscope appears in sharp focus together with the microscopic object. It is apparent that the first or reducing microscope is thereby set with conjugate focal planes at the two objects. The two microscopes are preferably placed in axial alignment with each other to act in opposition, with their objectives facing each other, the first or reducing microscope being usually below the second or magnifying microscope. In general a reduced image of a tangible object or of a source of light is projected in reverse direction by the reducing microscope upon the film or microscopic object which latter is preferably upon a slide mounted on a stage between the two microscopes. The upper microscope is first focused upon the object on the stage and then the lower microscope is manipulated until the image of the tangible object or source of light appears also in focus, when viewed through the magnifying microscope. When this occurs it will be understood that the object or source of light and the film or microscopic object are at conjugate focal planes of the lower or reducing microscope. It will thus be seen that by the use of the second or magnifying microscope, I provide a convenient arrangement for disposing conjugate focal planes of the first or reducing microscope at the two objects.

When the focal adjustments have thus been made, the source of light or tangible object in the ocular plane may then be moved about within this plane so that its image will fall in precisely the desired position upon the microscopic object, and, if the latter moves, the object in the ocular plane may be moved correspondingly.

It will be understood that instead of using the above arrangement for viewing directly with the eye the enlarged image of the microscopic object together with the superposed image of the tangible object, these superposed images may be projected upon a photographic film or plate lying in the ocular plane of the magnifying microscope and thus a photograph of ordinary size will be produced of the large object with the small object superposed thereon, the latter greatly magnified.

It will be noticed that when the two objects are at conjugate focal planes of the microscope the light from either one will be projected in focus upon the other. For this reason the same feature of the double microscope arrangement which facilitates the making of adjustments for projecting a reduced image of a tangible object upon a microscopic object or for making microscopic photographs or superposed photographs of the sort just described, facilitates also the making of the similar adjustments which are necessary for obtaining greatly magnified images and for making magnified photographs of microscopic objects. This will be described in detail below under the heading "operation".

Referring now to the accompanying drawings, Fig. 1 shows my preferred form of apparatus for executing all of the methods mentioned except that of making microscopic photographs of microscopic objects, and Figs. 2, 3 and 4 are purely diagrammatic views indicating manners of executing the methods, without the use of the apparatus shown in Fig. 1. Fig. 5 is a diagrammatic view illustrating my preferred method of making microscopic photographs of microscopic objects.

Referring to Fig. 1, I have shown a stand comprising a base 1 with upstanding lugs 2 having pivoted thereto as at 3 an adjustable support 4. Rigidly secured to the support 4 by any desired means, there is a stage 5 of a construction common in microscopes which need neither be shown nor described in detail. The stage should be provided upon its upper surface with clips (not shown) to hold a slide, but preferably has no other accessory attachments. Secured to the support 4 and to opposite sides of the stage 5 I prefer to provide a pair of compound microscope units 6 and 7 which may be of the ordinary construction in common use. The apparatus is frequently used with the adjustable support in vertical position, so that I will call the units 6 and 7 the upper and the lower unit respectively. Briefly, the upper or magnifying microscope 6 comprises an arm 8 having adjustably connected thereto a tube 9 provided with an eyepiece 10 at its upper end and an objective lens 11 at the lower end. The usual screw 12 is provided for making coarse settings and the knurled head 13 for making fine settings through gearing of known construction (not shown). The lower microscope 7 has preferably an objective 14 of the same magnifying power as the upper microscope and has its objective facing the stage 5 and its eyepiece 15 at the lower end. I preferably provide the eyepiece 15 with a double concave lens 16 instead of the usual convex lens, the purpose of this construction appearing clearly below. The eyepiece 15 of the lower microscope may, however, be omitted entirely in operations in which especially clear definition rather than great reduction of the image projected through the reducing microscope is desired. The terms "objective" and "eyepiece" refer to the elements designated by these names in the use of either microscope 6 or 7 singly or in the ordinary way. As will appear below some of these elements when used for carrying out the methods to be set forth are used in manners to which these terms are functionally inapplicable. A stage or platform 17 preferably lies upon the base 1.

The arm of the lower microscope is preferably rigidly secured to the supporting base 4 by any desired means as shown at 18. The arm 8 of the upper microscope is preferably secured to permit slight shifting thereof in order to dispose its optical axis into exact alignment with that of the lower unit. For this purpose the flanged base 19 of the microscope arm 8 is enclosed in a ring 20 secured to support 4 and having an inturned rim 21 overlapping the flange 19. Four set screws, two of which are shown at 22—23 pass through the lateral surface of the ring 20 and can be used for slightly shifting the arm 8 along the stage 5 to effect the alignment. Locking screws 24 passing through the rim 21 in the ring will clamp the microscope unit 6 in adjusted position.

In making a microscopic photograph of a microscopic object, the enlarged image of the said object obtained in the ordinary way through a magnifying microscope becomes the source of light for the operation of producing a microscopic photograph previously described, the light from the enlarged image being projected through a reducing microscope in the reverse direction and focused upon a photographic film lying in the objective plane of the reducing microscope. The eyepiece of both microscopes may be omitted in this process.

Operation: For making a microscopic photograph of a tangible object by my preferred method and by the aid of the preferred apparatus of Fig. 1, the tangible object will be laid upon the platform 17, any very little object will be placed upon the stage 5 and the upper microscope 9 will be adjusted into focus with the little object. The lower microscope 7 is then adjusted until the large object also is seen clearly in focus through the eyepiece 10 of the upper microscope. When this occurs it will be understood that a reduced image of the large object has been projected by the lower microscope 7 into the plane of the little object. The lower microscope has thus been set to dispose conjugate focal planes one at the large object and the other at the small object, and a small photographic film or plate may now be substituted for the small object, with its sensitive surface in the plane previously occupied by the small object, a dark screen of any suitable construction being used to enclose the stage. The ordinary daylight reflected from the large object will be focused upon the film with intensification corresponding substantially to the magnifying ratio of the microscope, so that a short exposure will be sufficient to produce a good microscopic image upon the film producing the negative from which prints may be made in the usual manner.

If it is desired to make a microscopic moving picture, the photographic film is given a rapid and periodic change of position under the objective of the reducing microscope by any automatic device desired, being at the same time held within the objective plane. Light from the objective must be cut off from the film while the film is in motion and allowed to fall on it during the interims when the film is at rest.

In order to make a drawing of a microscopic object upon an enlarged scale by the use of the apparatus shown in Fig. 1, a sheet of drawing paper 25 is laid upon the stage 17, the magnifying microscope 6 is adjusted to focus upon the microscopic object, and thereupon the lower microscope 7 will be adjusted until the paper is seen sharply in focus through the eyepiece of the upper microscope. It will be clear that the lower microscope has projected a greatly reduced image of the paper onto the microscopic object and the upper microscope has magnified this reduced image so that if the two microscopes are of similar power, the paper will appear to the eye substantially full size with a magnified image of the microscopic object thereupon. With a pencil or pen the operator may then make the enlarged contour or detail drawing of the microscopic object upon the paper, observing the object, the paper, and the movement of his hand and of the pencil through the eyepiece 10. Paintings, etchings, or other manual representations may be made in a similar manner, such as may readily be understood from the foregoing account.

As the ordinary microscope produces an inverted image of an object, difficulty would be experienced in tracing the outline, since the pencil or hand viewed through the eyepiece of the upper microscope would appear to move in a direction opposite to the actual movement. It is for this reason that the double concave lens is used in the eyepiece of the lower microscope. This double concave lens inverts the image lying in the objective plane whereas the usual convex lens eyepiece does not. The additional inversion thus effected will obviously result in the formation of erect images of the paper, the pencil and the movement of the latter when viewed through the microscopes in series. It may be noted that the double concave lens has the further important advantage of giving a larger field of vision than would a convex lens. It will be understood that other means such as a prism could be used for rectifying the image of the object lying on platform 17, but I prefer to employ the specific arrangement shown and described.

In order to perform measurements upon a microscopic object by the use of the apparatus shown in Fig. 1, an ordinary scale would be substituted for the sheet of paper upon the platform 17 and upon focusing the image of the scale upon the microscopic object by the method set forth above, it will be apparent from the above that the scale will appear of ordinary size if the two microscopes are of equal power and the microscopic object will appear superposed thereon in greatly magnified form. In order to obtain the true dimensions of the microscopic object, the readings taken upon the scale will, of course, have to be divided by the magnifying ratio of the lower or reducing microscope which ratio may easily be determined by substituting for the microscopic object to be measured another microscopic object of known size and obtaining its apparent measure on the ordinary scale.

Although I prefer to employ microscopes having objectives of equal powers for the above purposes, it is not essential to do so. If the powers be different the image of the paper or of the scale will appear to the eye as somewhat reduced or somewhat enlarged with respect to its dimensions when viewed with the naked eye; such adjustments of the differences in magnification, however, are usually secured more efficiently by adjustment of the power of the eyepiece 15 of the reducing microscope.

In order to use the apparatus shown in Fig. 1 for the purpose of subjecting a localized area of a microscopic object to the influence of light there will be substituted for the paper shown in Fig. 1 a plate or sheet having therein a bright spot of light such as may be produced by a pinhole or other hole of the shape corresponding to that of the localized area to be illuminated and of a size as many times larger than that area as the magnifying ratio of the lower or reducing microscope. A light is placed back of the plate or sheet and rays pass therefrom through the hole. Alternatively to the pinhole, a bright object such as a drop of mercury with light thrown upon it may be used. The image of the luminous pinhole or other opening in the sheet on the lower platform will be focused upon the microscopic object on the stage in the manner obvious from the above and the plate or sheet can be manually moved until the illumination is accurately centered upon the selected region of the microscopic object which is to be treated. If the microscopic object has no proper movement the plate or sheet with the pin hole is preferably black. It will be obvious that infra-red or ultraviolet rays may be employed instead of the visible rays either in the operation of treating a localized area of a microscopic object or in making a microscopic photograph, provided the lenses of the focusing microscope are made of a substance permeable to the rays.

In order to make the adjustments necessary for disposing the microscopic object or the film and the source of invisible light in conjugate focal planes and in the desired positions with relation to each other it will be desirable first to adjust the microscopic object or the film for a visible source of light in the manner previously described, focusing upon the microscopic object or film a greatly reduced image of the visible source, said image having the same size, shape and position with respect to the microscopic object as that desired for the image of the invisible source. The source of invisible light identical in pattern with that used for the visible light may then be substituted for the source of visible light, with due change in adjustments necessitated by the difference in refraction between the two kinds of light. Such readjustments may be made in the following manner: A piece of cross-ruled paper (coordinate paper) having the lines numbered is placed in the ocular plane, and the source of visible light is disposed so as to be projected in the desired fashion upon the microscopic object. A diagram of the shape, size and position of the source of light is then made upon the coordinate paper in the position in which it lies. For this coordinate paper is now substituted another piece of coordinate paper having the cross-ruled lines spaced differently, with the spaces so proportioned relatively to the spaces on the first paper that when the second paper is substituted for the first and when the invisible light is substituted for the visible and the change in focus made, the images of given lines on the second paper will fall upon the same places in the objective planes as the corresponding lines in the first coordinate paper previously fell. The source of invisible light is now constructed so that it will have the same position relative to the lines on this second paper that the source of visible light had to the lines on the first paper. The change in focus is made by turning the screw of the fine adjustment through a known distance measured on a graduated arc adjacent the screw. The distance required will have been previously determined by testing out the difference in focusing adjustment necessary for bringing the invisible light from a given objective plane into focus in the same ocular plane as that in which the visible light from the same objective plane was previously focused.

In subjecting a localized area of a microscopic object to visible light, if the microscopic object has a proper movement, it is preferable to employ a somewhat illuminated plate or sheet in which the pin hole or other bright area is formed or a sheet of a different color from that of the light with which the object is to be treated. The entire microscopic object will then be faintly visible or visible with the different colored light through the eyepiece 10 and the light from the bright area will be sharply focused upon the localized area to be treated. As the microscopic object moves the slightly illuminated plate is followed up with the hand to maintain the intensive light upon the selected area.

In the case of any of the above operations with visible light, the microscopic object, particularly if in the form of a unicellular organism may move upwardly or downwardly out of the plane upon which the microscopes are focused. This motion though through small distances can destroy the focus of the apparatus. In order to rapidly reestablish the focus under this condition the knurled head 13 of the upper microscope will be turned slightly in the appropriate direction to again produce a sharp outline of the object. Preferably the lower microscope is so interlocked with the upper that it need not be separately manipulated for the corresponding adjustment which is necessary for it. For this purpose the knurled head of the upper microscope is connected by a rigid bar 26 with the knurled head 13 of the lower microscope so that any slight displacement made upon the upper microscope will be simultaneously imparted to the lower microscope. Thus, if the organism moves upwardly a slight amount, both can be correspondingly moved in unison with each other, to reestablish the condition of focus. An alternative method is to have an adjustable stage, preferably with a coarse and fine adjustment, such as that provided upon many metallurgical microscopes, and instead of moving the microscope to move the stage in exact compensation for the upward or downward movement of the microscopic object.

In using the arrangement of two microscopes for facilitating the making of magnified photographs of microscopic objects, previously referred to, the following procedure is adopted: A sheet of paper is first placed in the ocular plane of the reducing microscope, and by the method previously described its image is made to fall in the desired position upon the microscopic object, which is in the objective plane between the two microscopes. A photographic film may then be substituted for this sheet of paper, surrounded by a dark enclosure, and a source of illumination may be substituted near the ocular of the magnifying microscope to take the place of the eye of the observer. The direction of the light thus becomes entirely reversed, and it travels in a "reversed" direction from eyepiece to objective, through what was previously the magnifying microscope, to be condensed upon the microscopic object for purposes of illumination. From the microscopic object the light then proceeds in the ordinary direction through what was previously the reducing microscope, to be focused as a greatly magnified image upon the photographic plate. This method avoids the difficulties which would be encountered in projecting and focusing the enlarged image upon a screen; it also renders the focus more delicate than could readily be effected by the use of a screen, and moreover avoids the necessity for the use of a darkened enclosure about said screen. The optimum mode of illumination to be used in the place of the eye after the substitution of the film for the paper is made, may previously have been determined by testing for the best illumination through the reducing microscope while making the observation with the eye. This same arrangement for illumination is now transferred from the ocular plane of what was previously the reducing microscope, to be projected in similar manner from the ocular plane of what was previously the magnifying microscope.

In those departments of reversed micrography when microscopic photographs are made, a specially thin film of particularly fine grain, such as may be secured by the so-called "albumin method" is preferably employed.

In making microscopic photographs of microscopic objects according to the method previously alluded to, two objectives may be rigidly held together permanently in such a position that they have a common focal plane between them. This double objective may then be substituted for the reducing microscope in the apparatus of Fig. 1 and adjustments may be made with it in a manner similar to that previously described in order to bring the object and the photographic film into conjugate focal planes in the desired positions. By using objectives of different magnifying power in the double objective instrument, various degrees of magnification or reduction of the representation of the microscopic object in the microscopic photograph may be effected.

The following shows how the preliminary step in the practice of the various acts set forth, which consists in disposing two objects, or one object and a source of light at conjugate focal planes, can be carried out without the use of the preferred apparatus of Fig. 1. Place the microscopic object on a slide upon the stage of the microscope and bring said object into focus in the objective plane and into proper position in that plane by the ordinary manual methods used in focusing and centering objects under the microscope, then illuminate the slide so as to project light through the microscope in the ordinary direction to produce a magnified image of the microscopic object in the ocular plane. Catch this image upon a ground glass or other screen by moving the same back and forth until a sharp magnified image is produced thereon. The slide and the screen are now in conjugate focal planes.

In Fig. 2 is shown, purely diagrammatically the apparatus for performing the steps just described. The microscopic object is shown at 30, upon a slide 31, the microscope appears at 32, the light at 33, the screen at 34 and the enlarged image at 35.

Conjugate focal planes having been determined as shown in Fig. 2, microscopic photographs of tangible objects may be made as indicated in Fig. 4. In Fig. 4 a tangible object 34⁴ has been substituted for the screen of Fig. 2 and a photographic film 30⁴ in a dark enclosure for the slide or microscopic object. The microscope thus throws a greatly reduced image of the tangible object upon the photographic film, and as above noted in the description of the practice of this art with the apparatus of Fig. 1, no separate source of illumination is needed.

The process of subjecting a selected localized area of a microscopic object to the influence of light may be carried out apart from the apparatus of Fig. 1 as shown for instance in Fig. 3. The relation of the parts in practicing this art can be identical with that shown in Fig. 2 except that 34³ represents a black screen containing a pin hole, a drop of mercury or other desired source of light which is substituted for the white screen of Fig. 2, the source of light having been placed at the spot 39 in the image of the tangible object corresponding to the spot to be treated in the microscopic object. The light is now projected through the microscope 32³ upon the desired localized area 27 of the microscopic object. It is understood that not only a small spot of light but any pattern or the image of a tangible object may thus be projected in precisely the desired spot upon any exposed portion of the microscopic object.

In Fig. 5 is shown an arrangement for making microscopic photographs of microscopic objects. The microscopic object or slide is shown at 30⁵ and its enlarged image formed by the first or magnifying microscope 40 is shown at 35⁵. A second or reducing microscope 41 is optically aligned with microscope 40 and serves to project a reduced image 37⁵ of the magnified image 35⁵ upon the film 42. The film is of course placed in a plane conjugate to that of the enlarged image with respect to microscope 41 and this by any of the methods set forth.

It will be understood that the preferred form of apparatus shown in Fig. 1 is not limited in its application to the specific uses described above.

I claim:—

1. The method of reversed microscopy which consists in projecting light from a source of the character described through a compound microscope, in the reverse direction upon a microscopic object lying in the objective plane, with the resultant superposition upon the microscopic object of a greatly reduced image of the source of light.

2. An optical instrument comprising a support carrying a stage and two microscope units on opposite sides of the stage and in axial alignment with each other, said microscopes being arranged with their magnifying powers in opposition.

3. An optical instrument comprising a support carrying a stage, a microscope unit upon said support and to one side of said stage, a microscope unit upon said support and to the opposite side of said stage, said units being axially aligned with each other and having objectives facing said stage.

4. An optical instrument comprising a support carrying a stage, a microscope unit secured to said support below said stage, a microscope unit secured to said support above said stage, said units having objectives facing said stage, said units being slightly adjustable relative to each other to dispose their optical axes into accurate alignment.

5. An optical instrument comprising a supporting stand, a stage mounted thereon, a microscope unit having an arm secured to said stand below said stage and having an objective facing said stage, a second microscope unit with an objective of the same power as said first unit having an arm secured to said stand above said stage and having an objective facing said stage, and means permitting slight shifting of said upper arm to accurately align the optical axes of said units.

6. The method of exactly adjusting the position of a greatly reduced image of a source of light upon any desired portion of a film or microscopic object, which consists in observing said image and film or microscopic object in their superposed, or nearly superposed relationship, through a magnifying microscope, and meanwhile manually altering the positions of the source of light, the microscopic object, or the reducing microscope, until the reduced image is observed to fall in the desired position upon the film or microscopic object.

7. An optical instrument comprising a supporting stand, a stage mounted thereon, two microscope units mounted thereon at opposite sides of said stage and having objectives facing said stage, one of said units being constructed to produce an erect image and the other to produce an inverted image.

8. An optical instrument comprising a supporting stand, a stage mounted thereon, two microscope units mounted thereon at opposite sides of said stage and having objectives facing said stage, the eyepiece of one of said units including a convex lens and that of the other a double concave lens.

9. An optical instrument comprising a supporting stand, a stage mounted thereon, two microscope units mounted thereon, with objectives of equal power, one above and the other below said stage, and having objectives facing said stage, the eyepiece of one of said units including a convex lens and that of the other a double concave lens, the latter unit having a greater ratio than the former.

10. The method of maintaining a greatly reduced image of any visible source of light in focus upon the plane of a microscopic object or film that has a motion in a direction parallel with the axes of the microscopes, which consists in first projecting through a reducing microscope a greatly reduced image of said source upon the microscopic object or film and viewing said object or film together with superposed reduced image through a magnifying microscope axially aligned with the reducing microscope, meanwhile continually moving the stage carrying the microscopic object along the optical axis so that said object appears continually in clear view.

11. An optical instrument comprising a support carrying a stage, two microscope units on opposite sides of the stage and in axial alignment with each other, said units having objectives facing said stage, said units having each a coarse adjustment means, and a fine adjustment means, and said stage having a fine adjustment means.

12. An optical instrument comprising a microscope having an eyepiece, an objective and a stage for supporting a microscopic object, and focusing means for projecting an image of an external body upon said microscopic object.

13. An optical instrument comprising a support carrying a stage, two microscope units on opposite sides of the stage and in axial alignment with each other, said microscopes being arranged with their magnifying powers in opposition, and means connecting said units for adjustment thereof in unison.

14. An optical instrument comprising a support carrying a stage, a microscope unit upon said support and to one side of said stage, a microscope unit upon said support and to the opposite side of said stage, said units being axially aligned with each other and having objectives facing said stage, said units having each a coarse adjustment means, and a fine adjustment means, and a rod connecting said fine adjustment means for operation thereof in unison.

15. The method of making a magnified picture which consists in projecting through a reducing microscope a greatly reduced image of a pictorial surface and an instrument, upon a microscopic object and tracing with said instrument a magnified picture of said object while viewing said object with the superposed image of said surface and instrument through a magnifying microscope.

16. In apparatus of the character described, in combination, a stand, a stage mounted thereon, two microscope units mounted thereon on opposite sides of said stage and having objectives facing said stage, a translucent plate having a small opening therethrough disposed adjacent the eyepiece of one of said microscopes, and a light arranged to project a beam through said hole and through the adjacent microscope to be focused upon said stage.

Signed at city of New York, in the county of New York and State of New York, this fifth day of June A. D. 1920.

HERMANN J. MULLER.